United States Patent [19]

Pond et al.

[11] 4,032,923

[45] June 28, 1977

[54] THERMOMAGNETIC IMAGING APPARATUS

[75] Inventors: Stephen F. Pond, Fairport; Eugene C. Faucz, West Webster, both of N.Y.

[73] Assignee: Xerox Corporation, Stamford, Conn.

[22] Filed: Nov. 12, 1975

[21] Appl. No.: 631,289

[52] U.S. Cl. .................................. 346/74.1; 360/59

[51] Int. Cl.[2] ..................... G11B 5/02; G03G 19/00

[58] Field of Search .............. 360/16, 59; 346/74.1; 240/47; 355/1

[56] References Cited

UNITED STATES PATENTS

| | | | |
|---|---|---|---|
| 3,611,415 | 10/1971 | Nelson | 360/59 |
| 3,613,102 | 10/1971 | Daly | 360/16 |
| 3,827,077 | 7/1974 | Kobilka | 360/59 |
| 3,845,306 | 10/1974 | Kohlmannsperger | 360/59 |
| 3,936,672 | 2/1976 | Tanaka | 240/47 |

FOREIGN PATENTS OR APPLICATIONS

| | | | |
|---|---|---|---|
| 1,099,983 | 1/1968 | United Kingdom | 360/59 |

OTHER PUBLICATIONS

Journal of Applied Physics, vol. 42, No. 4, Mar. 15, 1971, pp. 1763–1768, "$CrO_2$ Based Thermomagnetic Info. Storage & Retreival," R. K. Waring, Jr.

*Primary Examiner*—Jay P. Lucas

*Attorney, Agent, or Firm*—James J. Ralabate; Richard A. Tomlin; George J. Cannon

[57] ABSTRACT

A thermoremanent magnetographic imaging apparatus is disclosed. The apparatus includes an imaging transfer station which thermoremanently copies a graphic representation from a slave web onto the magnetizable surface of a master web. The thermomagnetic transfer is produced by exposing the slave and master webs while in intimate contact to a single intense burst of radiation from a flash lamp. The flash lamp is coaxially located within a transparent cylindrical carriage means which peripherally supports the slave and master webs during a full frame transfer process. Dual locking assemblies firmly hold the slave web and master web motionless during the thermomagnetic process to aid in the prevention of registration problems.

21 Claims, 6 Drawing Figures

THERMOMAGNETIC IMAGING APPARATUS

CROSS REFERENCE TO RELATED CASES

The present application is related to a co-pending application entitled "Flash Lamp Configuration for Magnetic Imaging", Ser. No. 631,006, filed on Nov. 12, 1975, in the name of S. F. Pond and assigned to the Assignee of the present invention.

BACKGROUND OF THE INVENTION

Field of the Invention

The invention pertains generally to the thermoremanent formation of a graphic image on a magnetizable surface and more particularly to a full frame thermomagnetic transfer station for forming such an image.

Prior Art

Upon heating a ferromagnetic material above a certain transition temperature, it is known that the material will become paramagnetic. This phase transition temperature, at which the ferromagnetic material loses the attributes that characterize it as ferromagnetic, is referred to as the Curie temperature. Normally, reversing the process i.e. cooling the material below the Curie temperature, will restore the ferromagnetic properties changed in the transition of phases.

One important parameter of a ferromagnetic material that is affected by the phase transition is the remanent magnetization exhibited by or stored in the material before the heating. Generally, after the application of a sufficiently large magnetic field to a susceptible hard ferromagnetic and its removal, the material will show a magnetic field of a certain magnitude that remains or is remanent. This phenomenon is the basis for the magnetic recording industry. However, when a material having a remanent magnetization is carried into the paramagnetic phase by heating, the remanent magnetization is lost. Thus, the heating of a ferromagnetic material beyond its Curie temperature can be utilized as a process for erasing remanent magnetization stored in a material. Further, since the coercivity of a ferromagnetic material is also a function of temperature and decreases to zero at the Curie point, the heating of a ferromagnetic material beyond its Curie point in the presence of an applied magnetic field and the subsequent cooling of the material is a method for recording the material with a magnetization.

The formation of a graphic image on a magnetizable surface by thermomagnetic recording or erasing with processes similar to these methods is known in the art. Particularly, a U.S. Pat. No. 3,555,556 issued to Nacci and the background patents cited therein are illustrative of references that describe the recording of optical images on magnetic media. Not only have direct thermomagnetic copying processes been described in the art but also those termed "reflexive." U.S. Pat. No. 3,698,005 and references cited therein describe a recording member for reflexive imaging where a magnetic material is heated beyond its Curie temperature by a flash procedure.

Usually, the energy used for thermoremanent imaging is provided by the electromagnetic radiations of a light source. An advantageous light source useful in many of the applications of thermoremanent imaging is a Xenon arc lamp in the shape of an elongated tube. These radiation sources are termed "flash lamps" or "flash tubes" because in their normal mode of use, a high voltage is applied by a charged capacitor across the electrodes of the lamps causing an arc or burst of radiation. The burst or flash of radiation is of a high intensity and of a short duration, randomly emanating along the length of the tube. The radiation spectrum formed is in the direction of a line of point sources and is generally on the order of half visible frequencies and half infra-red frequencies.

To focus the randomly directed energy spectrum from the flash tubes, the two aforementioned references have used either elliptical or parabolic lengthwise reflectors. These reflectors concentrate the electromagnetic radiation produced by the flash lamps into a window or slot of some limited arcuate reach and direct it toward the magnetic recording medium. With such a reflector in place, the image to be transferred to a recording medium must fit within the flash window or multiple exposures must be initiated to produce a successive series of partial transfers. Since, with reasonably sized flash lamps, a single flash exposure method severely limits the size of the document to be imaged, a multiple exposure method is preferred but incurs its own problems with the timing of the flashes, the non-overlap of spacings between flashes, and the transport of the image and recording medium without slippage or double exposure. Also, the spacing between the contacting transfer surfaces should be maintained to prevent blurring upon exposure. Further, notwithstanding these registration problems, the prior art does not efficiently use the energy flash from the arc lamps for the thermomagnetic recording of images because of these lengthwise reflectors.

SUMMARY OF THE INVENTION

The invention utilizes a thermomagnetic process to produce a graphical transfer of information from a slave web onto a magnetic master web. The process includes, in one embodiment forming a graphical image which is substantially non-transmissive to light on a transparent slave web. The transparency having differing optical densities in image and non-image areas is brought into intimate contact with a premagnetized master web and flash exposed to radiations from a flash lamp in a transfer step. The transfer step heats the premagnetized master web beyond its Curie temperature in the non-imaged areas and erases the magnetizations therein leaving a latent magnetic image in pattern-wise configuration.

In a second embodiment of the process, a latent magnetic image is formed on the slave web and subsequently brought into intimate contact with the master web in a transfer step. During this step, the master web is heated above its Curie temperature in a full area wide exposure and cooled in the presence of the latent magnetic image of the slave web to produce a transfer of the information. The latent magnetic image formed on the master web formed by either of the embodiments is then used in a high speed reproduction or duplication process. The duplication process includes developing the latent magnetic image with a toner and subsequently transferring the toned image to a copy sheet and the high speed repetitive iterations of these steps.

The transfer step described in the above two embodiments occurs within a novel thermoremanent (TRM) transfer station. The TRM transfer station includes a radiation means for flash exposing the sandwiched master-slave web combination. The radiation means is in the form of an elongated tube co-axial with a transparent cylindrical carriage means. The TRM station also comprises a pair of web transport rollers which carry the master-slave combination snugly around the periphery of the cylindrical carriage means and dual locking assemblies associated with the transport rollers.

The TRM station provides a convenient means for producing a full frame transfer of an image from the slave web thermomagnetically by a single flash exposure from the radiation means. The single flash exposure obviates timing problems and simplifies the equipment necessary to synchronize the flash to the image transport apparatus. Further, the cylindrical carriage means provides an efficient configuration for utilizing a substantial portion of the radiation envelope of the flash lamp as the energy is received directly onto a magnetizable web and not after reflection.

The web transport rollers, cylindrical carriage means, and locking assemblies in combination transport the master slave web combination in a facile manner while insuring slippage and registration problems do not occur.

Accordingly, it is an object of the invention to provide an improved thermomagnetic imaging process.

It is another object of the invention to produce a full frame TRM transfer from a slave web to a master web.

It is still another object of the invention to full frame transfer an image from a slave web onto a master web with a single flash exposure of a radiation means.

A further object of the invention is to produce the full frame, single flash, image transfer by a novel TRM transfer station.

A still further object of the invention is to substantially eliminate timing, double exposure, and registration problems during thermomagnetic image recording.

BRIEF DESCRIPTION OF THE DRAWINGS

These and other objects, features and aspects of the invention will become clearer and more fully apparent from the following detailed description when read in conjunction with the accompanying drawings, wherein.

DETAILED DESCRIPTION OF THE PREFERRED EMBODIMENTS

Figure 1:
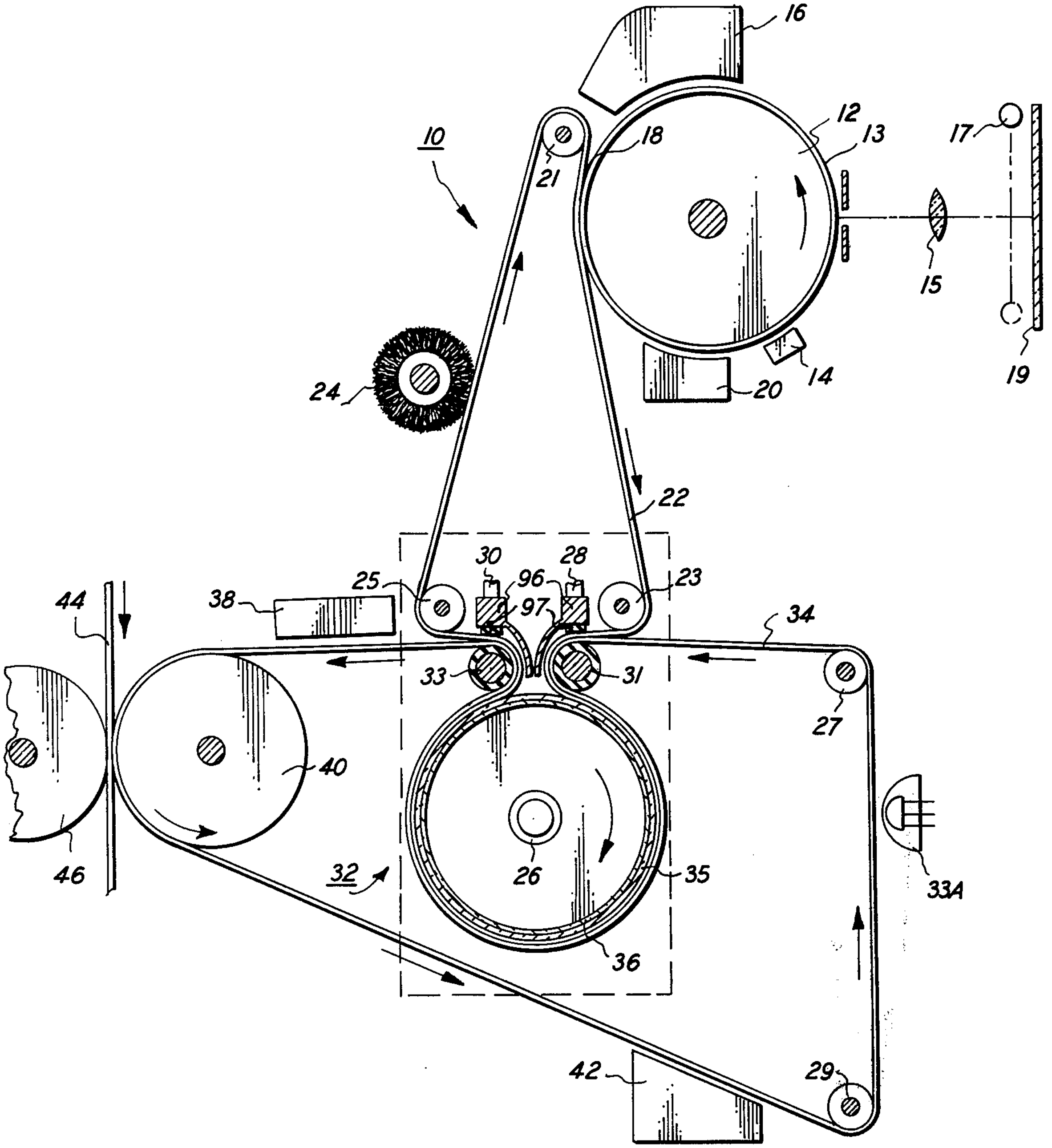
FIG. 1 is a schematic system diagram of a thermomagnetic imaging system constructed in accordance with the invention.

Referring now to the system diagram FIG. 1 there is shown a magnetic imaging system, generally designated by the numeral 10, incorporating a full frame TRM transfer station 32 constructed in accordance with the invention. The imaging system 10 includes a method for forming a graphic image on a transparent slave web 22. The method used will produce a web having image areas with a relatively high optical density compared to the lower optical density of the web surface. In a preferred manner the slave web image is produced by a xerographic reproduction.

The reproduction includes a xerographic drum 12 which has a photoconductive insulating layer 13 on its outside surface and a conductive supporting substrate. The xerographic drum 12 is rotated in the direction indicated and uniformly charged on its surface by the corona of a charging corotron 14. Once charged, the surface is imagewise exposed to actinic radiation by an exposure mechanism 17 and a lens 15. The radiation in imagewise configuration from an original 19 produces a charge differential pattern on the photoconductor 13 discharging it in the image areas and leaving a higher potential in the non-image areas. The electrostatic latent image produced by this method is toned at a developing station 16 where particulate toner powder is attracted electrostatically to the latent image in patternwise configuration. Thereafter at a transfer nip 18 the toned electrostatic image is transferred to the transparent slave web 22 and may be fixed in some manner thereon.

The xerographic process may be repeated after excess toner is cleaned from the photoconductive layer 13 by a drum cleaning station 20 to form other images on the slave web 22. A cleaning brush 24 is provided to remove the toner image from the slave web 22 after thermomagnetic transfer. Since the xerographic toner is relatively opaque, the image on the slave web 22 that was transferred by the xerographic process is an imagewise pattern that is non-light transmissive in relationship to the transparency of the web. Therefore, the web has alternating patterns of image and non-image areas with a difference in optical density and transmissivity to light. The slave web 22 may be made from a number of transparent plastics or the like, an advantageous choice being Mylar.

The xerographic process was used as an illustration as it is well known in the imaging art, however, the invention may use other methods of making a transparency that are obvious to one skilled in the art, for example, a photographic process or the like using a film with areas of differing optical densities could easily be substituted.

The slave web 22 is entrained about a set of rollers 21, 23, 25 at least one of which is powered in a conventional manner, such as by a motor (not shown). The endless web roller configuration illustrated in FIG. 1 for the slave web 22 is preferred but the system could just as easily use a scroll for the slave web. A take up and supply reel would be used instead of the roller configuration for the flexible web surface to travel upon.

The transparent image bearing slave web 22 is subsequently transported into the TRM transfer station, generally designated numeral 32, to perform a magnetic transfer to a master web 34. The master web is generally thought of as a multiple copy duplication web and hence the term master whereas the slave web used in this process is generally for single copy transfer to the master web and thereby designated the slave. The master web 34 is entrained upon a roller configuration comprising guide roller 27, guide roller 29 and a master web pressure roller 40, at least one of which is driven by a conventional motive apparatus (not shown).

The master web 34 is pre-recorded in alternating patterns of magnetization in this embodiment by a record head 33A. The record head is gated on and off by an alternating current source at the recording frequency (not shown). The resolution of the final magnetic image, of course, will depend upon the frequency at which the master web 34 is recorded and the web should have a magnetizable surface of a coercivity high enough to hold a high resolution pattern. Since the master web 34 also is to be heated above its Curie temperature, it must have a magnetizable surface with a reasonably low transition point. A preferred choice for such a web is a magnetic tape having a $CrO_2$ recording surface sold under the tradename Crolyn by the DuPont Corportion (BR = 1600 Gauss, Hc = 540 Oe, squareness = 0.9, Curie point = 132° C.). The slave web 22 and the image web 34 are then sandwiched around a transparent carriage cylinder 35 and held snugly in place by a pair of web transfer rollers 31 and 33 which are offset from the slave rollers 25 and 23.

The web transfer rollers 31 and 33 are opposed to each other and provide a convenient means for contacting the imaged master-slave web combination over substantially the entire 360° of the carriage cylinder 35.

While in intimate contact with each other, the webs are exposed in a full frame flash from a lamp 26 and the image on the transparent slave 22 transferred to the master web 34 by a single burst of radiation. The cylindrical configuration of the carriage cylinder 35 provides a supporting surface and insures that the master-slave web combination does not become separated. This substantially eliminates the spacing problem between the webs that could cause a blurring of the image during transfer. The flash lamp 26 in a preferred form may be a Xenon lamp coaxially located within the carriage cylinder 35. The flash of energy heats the master web 34 in the non-imaged areas above its Curie temperature and erases the pre-recorded pattern completely. The imaged areas are masked by the non-transmissive image on the slave web 12 to produce the imagewise transfer. The transfer station configuration further hold the webs in intimate contact so that no problem of lateral slippage occurs during the TRM transfer and the single flash of the lamp 26 provides a full frame exposure so registration and timing problems are obviated. Additionally, the cylindrical configuration allows the rapid movement of the master web to produce multiple copies in a duplicator mode as more fully described hereinafter.

Aiding in the process of firmly holding the two webs motionless during the flash transfer process are two locking assemblies 30 and 28 which are shown fragmented in FIG. 1 and are more fully described hereinafter. The locking assemblies 30 and 28 hold the sandwiched webs against the transfer rollers 31 and 33 just prior to the transfer and are released to allow web transport thereafter. To produce differing optical effects on the master web 34 a cylindrically shaped filter 36 may be used during the TRM transfer at the station 32.

The magnetic latent image now on the master web 34 can be developed with a ferromagnetic particulate at a magnetic development station 38. The methods of toning a latent magnetic image with a ferromagnetic powder and the toners that may be used in the procedure are well known in the art. Such methods and toners are described in U.S. Pat. Nos. 3,250,636; 3,825,936; 3,740,265 or 3,849,161 and other references. The transparency formed by the xerographic reproduction also moves out of the transfer station 32 and may be cleaned by the cleaning brush 24 and re-imaged as heretofore described.

After the magnetic latent image is developed, it proceeds to a transfer nip formed by the master web pressure roller 40 and an idler roller 46. Also entering the development nip is a copy sheet 44 to which the magnetic toner is transferred during its passage through the nip. The pressure transfer shown in the system is merely illustrative of a transfer technique and should not be in any way taken to limit the process to such. Other transfer methods of transferring a toned magnetic latent image onto a copy sheet may be used that are obvious to one skilled in the art.

After the image is transferred to the copy sheet 44 excess magnetic toner may be cleaned from the master web 34 by a magnetic toner cleaning station 42. Subsequently, the master web 34 is again re-recorded in the premagnetized pattern by the record head 33A and ready to receive another TRM transfer at the image station 32 and to repeat the magnetic development and transfer process. In a preferred form however a number of multiple copies are to be made from the magnetic master recorded on the master web 34 and the record head 33A is not energized. By retoning the latent magnetic image on the master web 34 and cycling through the development nip, a large number of multiple copies can be made easily and quickly because the slave web 22 and the image web 34 may move independently of one another. The master web may be cycled very quickly for making multiple copies and the slave web may be used very slowly to produce high resolution images for the transfer. The flash transfer process also takes place very quickly and can be accomplished as soon as the image and master web 34 are in registration with each other. Thus, the configuration of the novel TRM station and the master and slave web are well suited for a high speed duplication process.

Figure 2A:
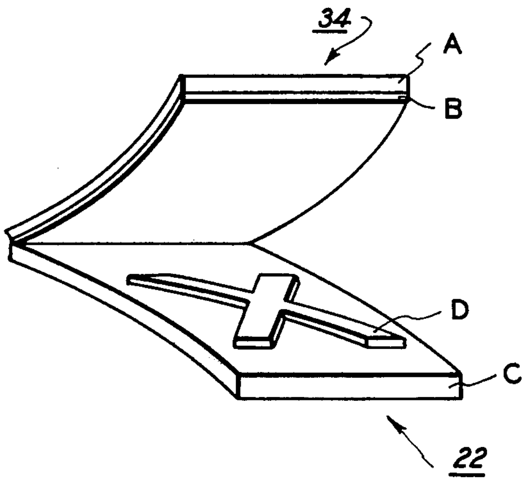
FIG. 2 consisting of 2A and 2B, is a partial schematic diagram illustrating a first and second embodiment of the master-slave web combination for the thermomagnetic imaging system of FIG. 1.
Figure 2B:
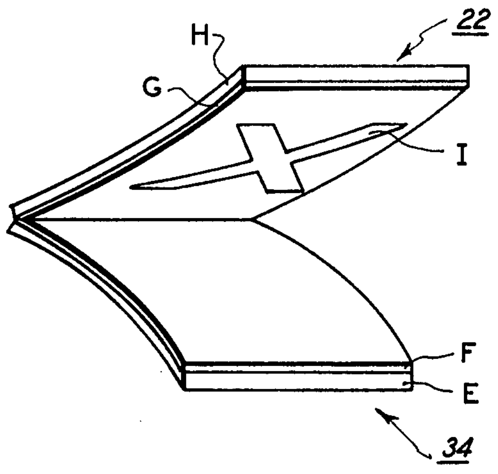

FIG. 2 illustrates alternative embodiments for the master web 34 and the slave web 22 combination. FIG. 2 shows a master web 34 having a flexible substrate A and a magnetizable surface B. The slave web 22 is shown as a transparent substrate C with a toner image D thereon. The transparent substrate C is the contacting surface on the carrying cyclinder 25. The TRM transfer for this embodiment has been described above. Alternatively, the sandwiched webs are shown in FIG. 2*b* where the master web 34 is shown as having a transparent substrate E with a magnetizable surface F. In this second embodiment the slave web 22 is shown to have a magnetizable surface G on a flexible substrate H. On the surface G the slave web 22 is recorded with a latent magnetic image I. A number of methods for recording a latent magnetic image on a magnetizable surface are known in the art. In operation, the slave and master combination are transported into the TRM station with the transparent substrate E in contact with the carriage cylinder 35 and the combination flash exposed. The magnetic surface F is thereby heated fully area wide beyond its Curie temperature and allowed to cool in intimate contact with the latent image I to produce an imagewise transfer.

Figure 3:
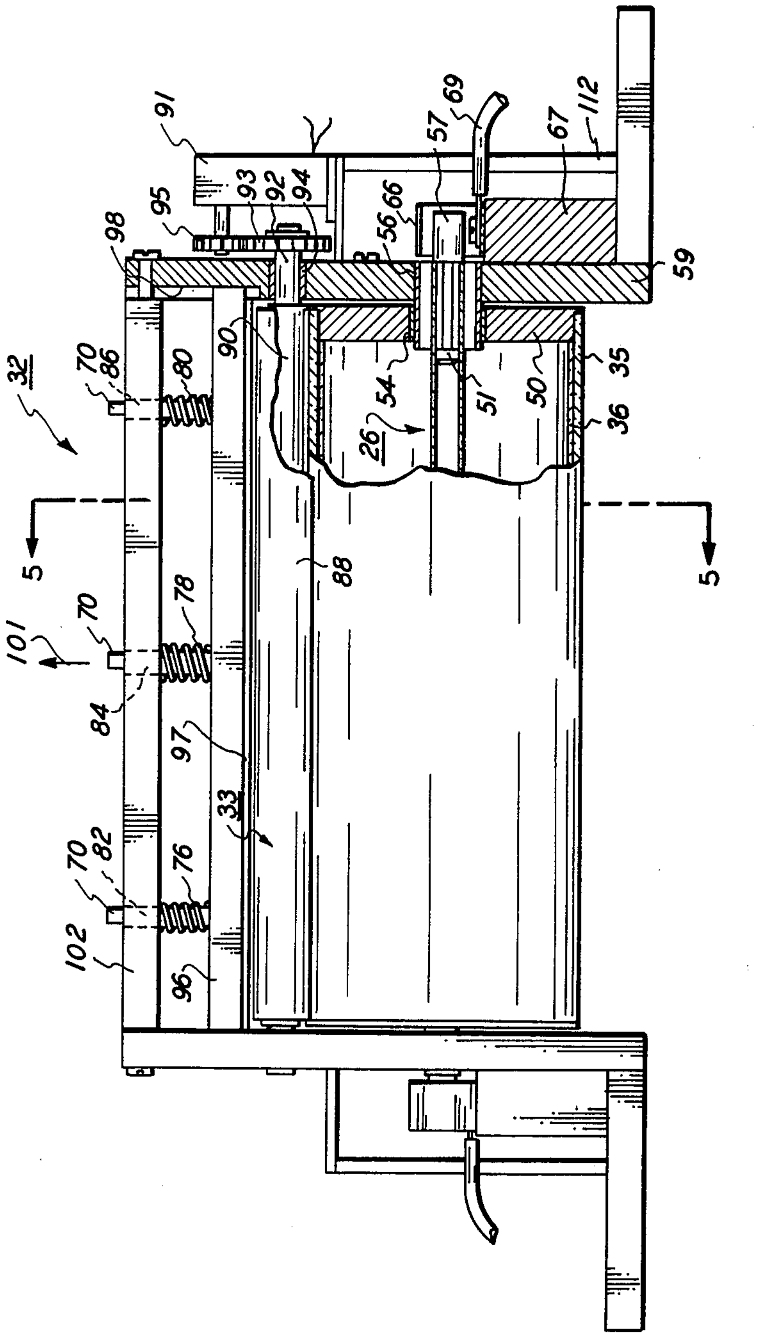
FIG. 3 is a detailed partial breakaway view in elevation of a novel full frame TRM transfer station for the thermomagnetic imaging system of FIG. 1.

The novel TRM transfer station 32 will now be more fully described with reference to the partially broken away view of FIG. 3. For ease in description and to more clearly see the advantages of the transfer station 32 the sandwiched web configuration is now shown around the carriage cylinder 35. In this figure there is illustrated the transparent cylindrical carriage means 35 which takes the form of a transparent drum. the carriage cylinder 35 may be made out of a plurality of materials including a high quality heat resistent glass such as Pyrex or a transparent plastic such as Lexan. Inserted in each end of the drum is an end cap 50 held in place by a lip or rim and having a centrally located aperture therethrough. Into each aperture of the end caps is press fitted a coaxial bearing 54 in the form of a thrust bushing or the like. The bearing 54 allows the transparent carriage cylinder 35 to rotate on a cylindrically shaped sleeve 56 which is force fitted through an aperture in a base member 59 of the TRM station. The bearing 54 allows the cylinder to rotate easily without producing a substantial amount of drag or frictional contact on the web combination.

Through the inner portion of the sleeve 56 and coaxial with the rotatable carriage cylinder 35 is the flash lamp 26. The flash lamp 26 comprises an electrode 51 on each end which terminates into a conductive mounting cap 57. The mounting cap provides a convenient way to securely fasten the flash lamp into a conductive metal clip 66 which is anchored to a support 67 of the base member 59. Mounting the flash tube in this manner through the sleeve 56 allows the tube to be easily removed and further permits the cylinder 35 to rotate independently while the flash tube 26 remains stationary. The sleeve also produces an important function of providing an aperture whereby an air current may carry the heat developed by the flash lamp away from the inner portion of the cylinder. The clip 66 also retains a high voltage cable 69 with a connector or the like. A single flash of the lamp 26 can most conveniently be accomplished by closing a switch between the lamp and a charge of high voltage through the cable 69. The stored voltage of a parallel capacitor is usually used to cause the breakdown or ionization of the gas encased in the tube and provide the short duration high energy burst or flash that is needed for the thermomagnetic transfer.

Voltages in the range of 2000-3000 volts can be used and a capacitor of between 60–100 $\mu f$ is an advantageous choice. The burst of energy emanating from the flash lamp is then on the order of $2\text{-}3 \times 10^6$ ergs/cm$^2$ on a cyclinder surface having a diameter of 2.75 ins. for a duration of approximately 150 $\mu$ sec. A flash lamp that can be utilized in this process is a 6L6 lamp produced by ILC Corporation of Sunnyvale, California.

Providing for a snug grasp of the sandwiched master slave web combination is the web transfer roller 33 which comprises an inner shaft 90 and, on each end, a roller shaft 92. The roller shaft 92 is journeled in a sleeve bearing 94 that has been press fitted through the support member 59. The inner shaft 90 is covered with a soft outer layer 88 which may be a rubber tubing placed over the shaft 90. To give a better grip on the web combination, the outer layer 88 may be corrugated or have a gripping pattern on the outside surface. It is important however that the outside layer 88 be soft and not scratch or abraid the web surfaces.

Figure 4:
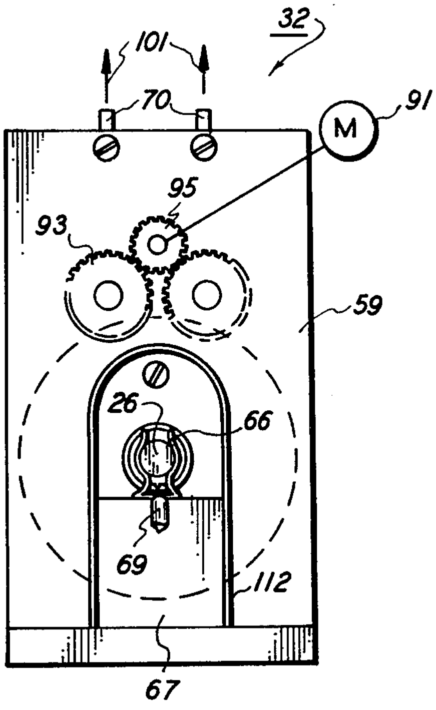
FIG. 4 is an end view of the novel full frame TRM transfer station of FIG. 3.

The transfer rollers are powered by gear 93 which is meshed with a gear 95 powered by a motor 91. The gearing and motion of the rollers 31, 33 are better illustrated with reference to FIG. 4 where there is shown the drive gear 93 and an opposite drive gear 103. These gears 93, 103 are driven synchronously by meshing with the power gear 95 of the motor 91 (shown schematically). A protective housing 112 is used to protect personnel from the high voltage electrodes of the flash lamp 26.

With references again to FIG. 3, there is located above each web transport roller 33 a locking assembly comprising a locking bar 96 having a soft locking surface 97 adhered thereto. The locking bar 96 moves vertically in a reciprocating fashion in a slot 98 in the base member 59 of the TRM station 32. Aligning the locking bar 96 along the length of the transport rollers are studs 70 threaded into the locking bar and positioned through apertures 82, 84, and 86 in a transverse support member 102. The support member 102 provides a biasing force against which bias springs 76, 78 and 80 push. A force 101 (schematically illustrated) is used to retain the locking bar 96 against the bias spring pressure when not it use. This force may be an air piston, another stronger bias spring, or other conventional means known in the art. The force is released when the locking bar is to be used to hold the webs onto the rollers 31 and 33.

Figure 5:
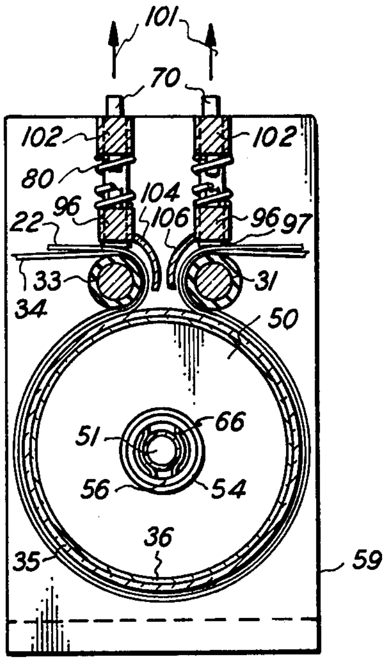
FIG. 5 is a cross-sectional view of the novel full frame TRM station sectioned along line 5—5 of FIG. 3.

The sectioned FIG. 5 better illustrates the relationship of the locking bar 96, transverse support member 102 and locking surfaces 97. The imaged slave web 22 and the master web 34 are transported around the rollers 31, 33 and cylindrical carriage cylinder 35 in a full frame exposure configuration and guides 104 and 106 prevent the webs from bunching and slipping off the rollers 31 and 32. When the image is in place and ready to be transferred by the TRM station 32 the force 101 which is holding the locking bars 96 up is de-energized and the locking assemblies under the power of the biasing springs lock the web onto the rollers to provide a set registration. The two sandwiched webs then remain motionless in relationship to one another while the flash is taking place. After the positioning has taken place, the transfer is accomplished by the single flash of the lamp 26, thereafter, the locking assemblies are released by energizing the holding force 101 and the webs may move independently once more.

While the invention has been described in detail in relation to a number of preferred embodiments, those skilled in the art will understand that other changes in form and detail may be made therein without departing from the spirit and scope of the invention wherein all such changes obvious to one skilled in the art are encompassed in the following claims.

What is claimed is:

1. A thermoremanent imaging method comprising:

providing a slave web with patternwise information recorded thereon, providing a master web having a magnetizable surface, transporting said slave web and master web into intimate contact with each other around substantially the entire periphery of a transparent cylindrical carriage means, flash exposing the contacted means from within said carriage means with a single flash from a radiation source to perform a full frame thermomagnetic transfer.

2. A thermoremanent transfer apparatus for thermomagnetically transferring an image from a slave web onto a master web comprising:

a transparent cylindrical carriage means, web transport means cooperating with said carriage means for transporting said slave web and said master web into intimate contact around substantially the entire periphery of said carriage means; and a radiation source located within said carriage means for producing a thermomagnetic transfer of the image from the slave web onto the master web.

3. A thermoremanent transfer apparatus as defined in claim 2 further comprising:

locking assembly means, co-acting with said web transport means, for producing a set registration between said slave web and said master web during said transfer.

4. A thermoremanent transfer apparatus as defined in claim 2 wherein said transparent cylindrical carriage means has a peripheral surface area approximately equal to the image area to be transferred from the slave web.

5. A thermoremanent transfer apparatus as defined in claim 4 wherein said radiation source performs said thermomagnetic transfer with a single burst of radiation.

6. A thermoremanent transfer apparatus as defined in claim 5 wherein said radiation source is in the form of an elongated tube co-axially located within said cylindrical carriage means.

7. A thermoremanent transfer apparatus as defined in claim 6 wherein said radiation source is a Xenon flash lamp.

8. A thermoremanent transfer apparatus as defined in claim 6 wherein said web transport means are a pair of opposing rollers, extending longitudinaly along the surface of the cylindrical carriage means, having the longitudinal axis of each roller substantially parallel with the axis of the carriage means and spaced apart by a limited radial arc of the carriage means, said webs entrained about the rollers and the carriage means such that the webs cover substantially the entire periphery of the carriage cylinder.

9. A thermoremanent transfer apparatus as defined in claim 8 wherein each roller comprises:

an inner roller connected to means for rotating said roller and;

a soft outer surface covering said inner roller and contacting said webs.

10. A thermoremanent transfer apparatus as defined in claim 9 wherein said means for rotating each roller are driven together in a synchronous fashion.

11. A thermoremanent transfer apparatus as defined in claim 10 wherein said cylindrical carriage means is journaled for rotation at each end and said radiation source is stationary.

12. A thermoremanent transfer apparatus as defined in claim 11 wherein said carriage means has an aperture at each end for mounting said radiation source therethrough and for providing a passage for an airflow therethrough.

13. A thermoremanent transfer apparatus as defined in claim 12 wherein said locking assembly means comprises:

a pair of elongated locking members, spaced away from said rollers each member running substantially the entire length of a roller and having a locking surface between the member and the associated roller;

bias means for moving said locking members toward said rollers prior to said transfer thereby locking the webs entrained about the rollers between the roller and the locking surfaces; and second bias means for moving said locking member away from said rollers subsequent to said thermomagnetic transfer.

14. A thermoremanent imaging system comprising:

a moveable slave web;

imaging means for providing the slave web with patternwise information recorded thereon;

a moveable master web having a magnetizable surface;

a thermomagnetic transfer station for moving said slave and master web into intimate contact and for producing a full frame transfer of said patternwise information from said slave web onto said master web with a single burst of radiation; and duplication means for producing a multiplicity of visible copies from the transferred pattern on said master web.

15. A thermoremanent imaging system as defined in claim 14 wherein said moveable slave web is transparent and wherein said master web is premagnetized.

16. A thermoremanent imaging system as defined in claim 15 wherein said imaging means include:

exposure means for forming an electrostatic latent image of an original document on a photoconductive surface;

developing means for toning the electrostatic latent image with an opaque particulate toner; and transfer means for transferring said toned image from said photoconductive surface onto the surface of said slave web in patternwise configuration whereby the slave web has areas of differing optical density corresponding to image and non-image areas.

17. A thermoremanent imaging system as defined in claim 15 wherein said duplication means include:

magnetic development means for decorating the latent magnetic image transferred to the master web with a magnetic toner, and magnetic transfer means for transferring the toned image to a copy sheet.

18. A thermoremanent imaging system as defined in claim 17 wherein said imaging system includes:

a magnetic cleaning station for removing magnetic toner from the master web after said toner transfer to a copy sheet and;

recording means to remagnetize said master web before entering said thermomagnetic transfer station.

19. A thermoremanent imaging system as defined in claim 14 wherein said thermomagnetic transfer station comprises:

a transparent cylindrical carriage means, web transfer means cooperating with said carriage means for transporting said slave web and said master web into intimate contact around substantially the entire periphery of said carriage means; and a radiation source located within said carriage means for producing a thermomagnetic transfer of the image from the slave web onto the master web.

20. A thermoremanent imaging system as defined in claim 14 wherein said master web has a transparent substrate and said slave web has a magnetic surface.

21. A thermoremanent imaging system as defined in claim 20 wherein said imaging means include:

magnetic means for magnetically recording said slave web with a magnetic latent image in patternwise configuration corresponding to an original document.

* * * * *